United States Patent
Hariharan et al.

(10) Patent No.: US 11,451,931 B1
(45) Date of Patent: Sep. 20, 2022

(54) MULTI DEVICE CLOCK SYNCHRONIZATION FOR SENSOR DATA FUSION

(71) Applicant: Apple Inc., Cupertino, CA (US)

(72) Inventors: Sriram Hariharan, San Jose, CA (US); John D. Blackwell, San Francisco, CA (US); Jonathan C. Shavit, Sunnyvale, CA (US); Jay N. Bruins, Los Altos, CA (US); Carter B. Peterson, San Francisco, CA (US); Daniel E. Loffgren, San Jose, CA (US); Akifumi Kobashi, Palo Alto, CA (US); Jacob S. Weiss, San Francisco, CA (US); Todd Wheeler, San Jose, CA (US)

(73) Assignee: Apple Inc., Cupertino, CA (US)

( * ) Notice: Subject to any disclaimer, the term of this patent is extended or adjusted under 35 U.S.C. 154(b) by 11 days.

(21) Appl. No.: 17/112,376

(22) Filed: Dec. 4, 2020

Related U.S. Application Data

(63) Continuation of application No. 16/539,525, filed on Aug. 13, 2019, now abandoned.
(Continued)

(51) Int. Cl.
*H04W 4/029* (2018.01)
*H04W 4/38* (2018.01)
(Continued)

(52) U.S. Cl.
CPC .......... *H04W 4/029* (2018.02); *G06K 9/6288* (2013.01); *H04W 4/38* (2018.02); *H04W 56/001* (2013.01); *H04W 76/10* (2018.02)

(58) Field of Classification Search
CPC ....... H04W 4/029; H04W 4/80; H04W 76/10; H04W 4/38; H04W 12/009; H04W 84/18;
(Continued)

(56) References Cited

U.S. PATENT DOCUMENTS

| 8,234,395 | B2 | 7/2012 | Millington |
| 9,116,220 | B2 | 8/2015 | Liu et al. |

(Continued)

OTHER PUBLICATIONS

"Non-Final Office Action," dated Jun. 9, 2020 in U.S. Appl. No. 16/539,525, 9 pages.
(Continued)

*Primary Examiner* — Andrew Wendell
(74) *Attorney, Agent, or Firm* — Kilpatrick Townsend & Stockton LLP

(57) ABSTRACT

Immersive audio can be generated and/or updated in real-time as an accessory device presenting the audio is moved with respect to a computing device presenting accompanying video content. This real-time immersive audio is enabled by determining positions of the accessory device with respect to the computing device, based on real-time analysis of sensor information from the accessory device and the computing device. Accurate positions can be determined by synchronizing timestamped sensor data from the multiple devices through the use of a clock of a common wireless communication link (e.g., a Bluetooth connection), which may have lower drift than the global clocks of the devices themselves. Calculated offsets associated with differences between the clock of the wireless communication link and the global clocks of the multiple devices can be used to account for inaccuracies in the global clocks of the multiple devices with respect to one another.

20 Claims, 10 Drawing Sheets

Related U.S. Application Data

(60) Provisional application No. 62/738,487, filed on Sep. 28, 2018.

(51) Int. Cl.
*H04W 76/10* (2018.01)
*H04W 56/00* (2009.01)
*G06K 9/62* (2022.01)

(58) Field of Classification Search
CPC .. H04W 56/001; H04B 5/0043; G06K 9/6288
See application file for complete search history.

(56) References Cited

U.S. PATENT DOCUMENTS

| | | |
|---|---|---|
| 9,332,160 B1 | 5/2016 | Chenillo et al. |
| 9,408,011 B2 | 8/2016 | Kim et al. |
| 9,549,235 B2 | 1/2017 | Oh et al. |
| 9,886,234 B2 | 2/2018 | Lin et al. |
| 9,918,177 B2 | 3/2018 | Horbach |
| 2009/0024395 A1 | 1/2009 | Banba |
| 2011/0276333 A1 | 11/2011 | Wang et al. |
| 2013/0156207 A1 | 6/2013 | Visser et al. |
| 2014/0355951 A1 | 12/2014 | Tabak |
| 2015/0089051 A1 | 3/2015 | Ojanperä |
| 2015/0092642 A1 | 4/2015 | Geboff et al. |
| 2015/0228274 A1 | 8/2015 | Leppänen et al. |
| 2017/0195568 A1 | 7/2017 | Leizerovich, Jr. et al. |
| 2017/0201942 A1 | 7/2017 | Mathews et al. |
| 2017/0366896 A1 | 12/2017 | Adsumilli et al. |
| 2018/0046431 A1 | 2/2018 | Thagadur Shivappa et al. |
| 2018/0203663 A1 | 7/2018 | Lehtiniemi et al. |
| 2018/0280759 A1 | 10/2018 | Lyske |
| 2019/0037018 A1 | 1/2019 | Scurrell et al. |
| 2019/0088131 A1 | 3/2019 | Bushnell |
| 2019/0110264 A1 | 4/2019 | Chung et al. |
| 2019/0170785 A1 | 6/2019 | Riccardi et al. |
| 2019/0212824 A1 | 7/2019 | Keller et al. |
| 2019/0250879 A1 | 8/2019 | Blume et al. |

OTHER PUBLICATIONS

"Notice of Allowance," dated Feb. 3, 2020 in U.S. Appl. No. 16/539,525, 11 pages.

600

```
┌─────────────────┐         ┌─────────────────┐
│ Receive First   │         │ Receive Second  │
│ Sensor Data     │         │ Sensor Data     │
│ associated with │         │ associated with │
│ the Computing   │         │ the Accessory   │
│ Device          │         │ Device          │
│ 602             │         │ 604             │
└────────┬────────┘         └────────┬────────┘
         │                           │
         └───────────┬───────────────┘
                    ▼
         ┌─────────────────────┐
         │ Synchronize First   │
         │ Sensor Data and     │
         │ Second Sensor Data  │
         │ 606                 │
         └──────────┬──────────┘
                    ▼
  ┌──────────────────────────────────────────┐
  │ Calculate relative position/orientation  │
  │ of the Accessory Device with respect to  │
  │ the Computing Device using First Sensor  │
  │ Data and Second Sensor Data              │
  │ 608                                      │
  └──────────────────┬───────────────────────┘
                     │
  ┌ ─ ─ ─ ─ ─ ─ ─ ─ ─┼ ─ ─ ─ ─ ─ ─ ─ ─ ─ ─ ┐
  │ Generate Movement Prediction based on   │
  │ First Sensor Data and Second Sensor Data│
  │ 610                                     │
  └ ─ ─ ─ ─ ─ ─ ─ ─ ─┬ ─ ─ ─ ─ ─ ─ ─ ─ ─ ─ ┘
                     ▼
  ┌──────────────────────────────────────────┐
  │ Generate immersive spatial audio based on│
  │ relative position of the Accessory Device│
  │ with respect to the Computing Device     │
  │ and/or the Movement Prediction           │
  │ 612                                      │
  └──────────────────────────────────────────┘
```

```
┌─────────────────────────────────────────────────────────────┐
│ Transmit, to an accessory device, an audio signal related   │
│ to content presented on a computing device                  │
│                          702                                │
└─────────────────────────────────────────────────────────────┘
                              │
┌─────────────────────────────────────────────────────────────┐
│ Receive position information related to a relative position │
│ of the accessory device with respect to the computing device│
│                          704                                │
└─────────────────────────────────────────────────────────────┘
                              │
┌─────────────────────────────────────────────────────────────┐
│ Generate an updated audio signal based on the position info │
│                          706                                │
└─────────────────────────────────────────────────────────────┘
                              │
┌─────────────────────────────────────────────────────────────┐
│ Transmit the updated audio signal to the accessory device   │
│                          708                                │
└─────────────────────────────────────────────────────────────┘
```

FIG. 7

800

Receive, at an accessory device, an audio signal related to content presented on a computing device
802

Receive position information related to a relative position of the accessory device with respect to the computing device
804

Generate an updated audio signal based on the position information
806

| Mix selected portions of the audio signal into an updated audio signal 808 | Apply audio effects to the audio signal to generate the updated audio signal 810 |

Present the updated audio signal at the accessory device
812

FIG. 8

MULTI DEVICE CLOCK SYNCHRONIZATION FOR SENSOR DATA FUSION

CROSS REFERENCES TO RELATED APPLICATIONS

This application is a continuation of U.S. application Ser. No. 16/539,525, filed Aug. 13, 2019 entitled, "MULTI DEVICE CLOCK SYNCHRONIZATION FOR SENSOR DATA FUSION," which claims priority to U.S. Provisional Application Ser. No. 62/738,487, filed Sep. 28, 2018 entitled, "MULTI DEVICE CLOCK SYNCHRONIZATION FOR SENSOR DATA FUSION," which are hereby incorporated by reference in their entirety for all purposes.

TECHNICAL FIELD

The present disclosure relates to management of sensor data generally and more specifically to synchronizing sensor data across multiple devices, e.g., to provide 3D spatial audio of an immersive video.

BACKGROUND

Many modern devices contain sensors for generating signals in response to some sensed input. For example, many devices contain inertial measurement units (IMUs) that can obtain sensor data associated with the movement or position of the device in a frame of reference. Sensor data is often timestamped, such as during capture of the sensor data.

In some cases, multiple sensor streams (e.g., timestamped data sets) can be used together to obtain information related to both sensor streams. However, accurate timestamping can be important when using multiple sensor streams, such as to be able to analyze synchronal data points from each of the sensor streams.

Combination of multiple sensor streams can be especially difficult when the sensor data is generated across multiple devices. When multiple devices are used, each device may have its own internal clock, which may have different accuracy and drift from one another. Therefore, timestamped data from one device may not properly match up with timestamped data from another device. These inaccuracies can make it difficult to fuse together (e.g., analyze together) sensor streams from disparate devices, especially for purposes where precise time resolution is necessary, such as detecting and/or predicting movements of the devices relative to one another.

SUMMARY

A technique for synchronizing of sensor data between multiple devices having separate internal clocks, such as a computing device (e.g., smartphone, tablet etc.) and a wireless headphones, can leverage the relatively accurate clock used in a wireless communication protocol (e.g., Bluetooth) between the devices. Timing offsets between the clock of the wireless communication protocol and the devices' internal clock(s) can be determined and can be used to synchronize the timestamped sensor data. Synchronizing the timestamped sensor data can include adjusting existing timestamps in an existing sensor data stream or generating a sensor data stream with already-adjusted timestamps (e.g., adjusted on the fly or by making periodic adjustments to the device's internal clock).

Synchronized sensor data can be used to detect spatial orientation between the multiple devices. In one example, the relative spatial orientation between a smartphone and headphones can be used to generate immersive audio signals associated with video content being displayed on the smartphone. Depending on the movement of the head of a user wearing the headphones, the immersive audio signals can change as the user's head moves relative to the video content. The synchronization of the sensor data can enable prediction of head movements and positions, which can in turn be used to generate the appropriate immersive audio signals for the predicted motion, and thus a predicted position, which can be transmitted to the headphones. Thus, any delay between a user's head moving relative to the video content and the appropriate immersive audio signal being played through the headphones can be reduced or eliminated.

In some cases, immersive audio can be generated at the computing device, although that need not be the case. In some cases, the headphones can generate immersive audio in realtime, such as by applying audio effects to an incoming audio stream (e.g., stereo effects such as delay, reverb, and filtering), or by mixing an audio signal from a set of available incoming audio streams.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

BRIEF DESCRIPTION OF THE DRAWINGS

The specification makes reference to the following appended figures, in which use of like reference numerals in different figures is intended to illustrate like or analogous components.

FIG. 6 is a flowchart depicting a process of generating immersive spatial audio using synchronized sensor data according to certain aspects of the present disclosure.

FIG. 7 is a flowchart depicting a process for generating spatial audio signals on a computing device according to certain aspects of the present disclosure.

FIG. 8 is a flowchart depicting a process for generating spatial audio signals on an accessory device according to certain aspects of the present disclosure.

DETAILED DESCRIPTION

Figure 1:
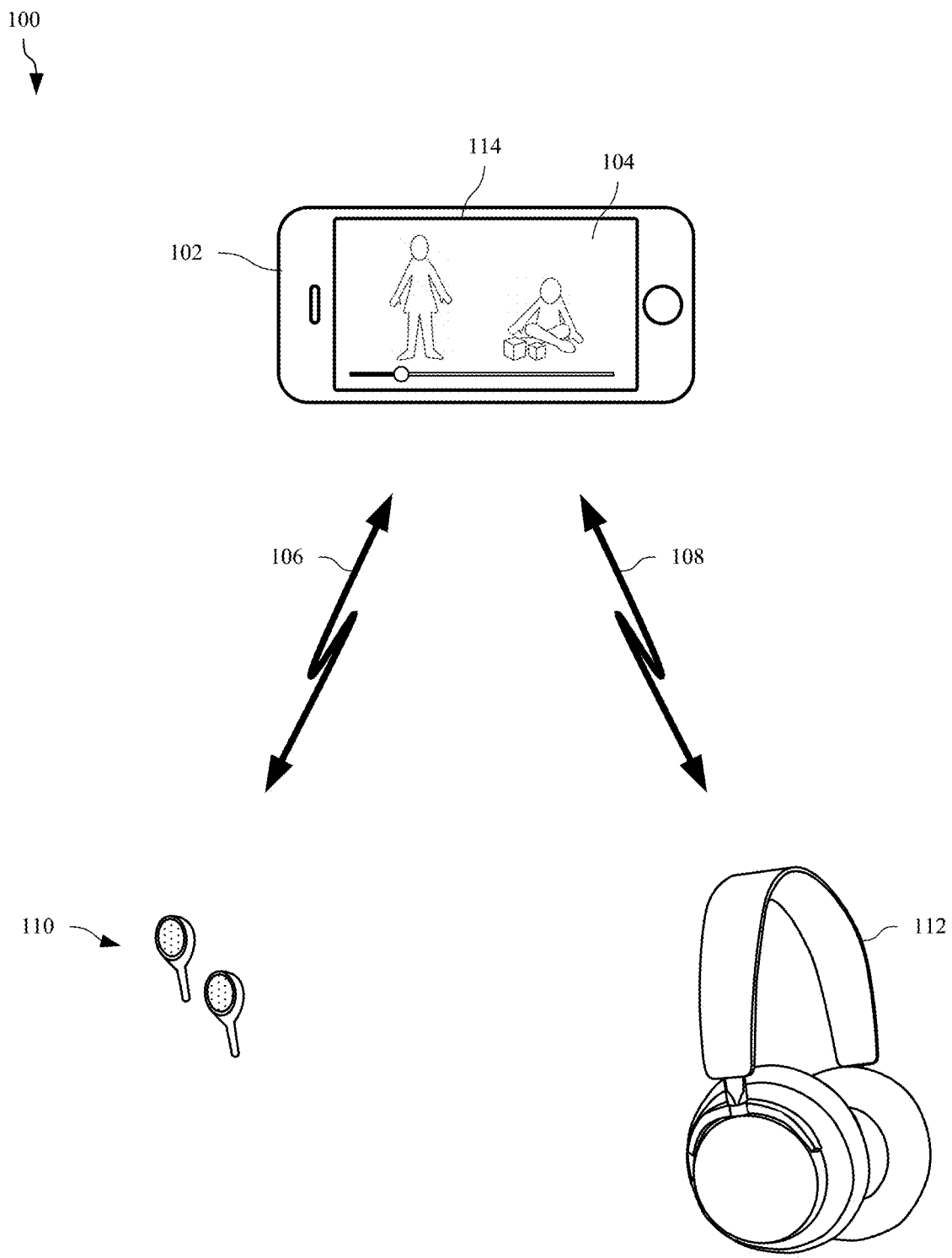
FIG. 1 is a schematic diagram depicting a sensor synchronization environment according to certain aspects of the present disclosure.

Certain aspects and features of the present disclosure relate to synchronizing timestamped sensor data that is collected from multiple devices connected by a common wireless communication link. Each of the multiple devices can have an internal clock that may be used to timestamp the sensor data. The wireless communication link (e.g., a Bluetooth connection) can have a clock, which may be more accurate (e.g., have less drift) than one or more of the internal clocks of the multiple devices. By calculating one or more offsets associated with differences between the clock of the wireless communication link and one or more of the internal clocks of the multiple devices, the one or more offsets can be used to account for inaccuracies in the internal clocks of the multiple devices with respect to one another. The one or more offsets can be used to update timestamped data streams, can be used to update internal clocks, or can be used, in conjunction with internal clocks, to generate data streams with adjusted timestamped data.

Once the timestamped sensor data from the multiple devices is synchronized, accurate analysis can be performed on the synchronized sensor data. The high accuracy of the clock of the wireless communication link can allow precise and rapid analysis to occur. Further, because the data points from the various data streams can be assumed to be synchronized with a high degree of accuracy, any analysis of the synchronized sensor data can be made with smaller error, and potentially with fewer data points, and thus performed more quickly. In some cases, the advantages of sensor data that has been synchronized as described herein can permit for very rapid detection and/or prediction of movements of a device. More specifically, the advantages of sensor data that has been synchronized as described herein can permit for very rapid detection and/or prediction of the position of one device with respect to one or more other devices. As used herein, a position can be inclusive of a location and/or an orientation (e.g., a relative position of one device with respect to another can refer to a relative orientation of one device with respect to another). In some cases, the detection and/or prediction of a position can be used to generate spatially rendered content, such as spatially rendered audio content, that can be transmitted through the wireless communication link.

In an example described in further detail herein, sensor data from a computing device (e.g., a smartphone, computer coupled to a display, or smart television) can be synchronized with sensor data from an accessory device that is a set of headphones. As used herein, the term headphones can be inclusive of any set of monaural or stereo speakers that are associated with a position of a user (e.g., removably coupled to a user's body, such as at the head or ears), such as earbuds, headsets, or the like. The term headphones can be inclusive of in-ear devices, on-ear devices, over-ear devices, or bone-conduction devices.

In the above example, the sensor data can be orientation data from inertial measurement units (IMUs) of the smartphone and accessory device, although other types of sensor data can be used. After synchronizing the sensor data as described herein, the synchronized sensor data can be rapidly analyzed to determine a relative position of the headphones with respect to the smartphone. In some cases, this analysis can also determine a predicted movement of the headphones with respect to the smartphone. The relative position or the predicted movement can be used to generate an audio signal to be sent from the smartphone to the headphones. As examples, this generated audio signal can be an immersive stereo, binaural, or three-dimensional audio signal. The end result can be that as a user begins turning his or her head from a first position to a second position, this movement can be rapidly detected before the user's head reaches the second position and a movement prediction can be made that the user's head will reach the second position. From this prediction, an immersive audio signal associated with the second position can be rapidly generated and transmitted to the headphones so that it can be played at or approximately at the time the user's head reaches the second position. Thus, as a user's head turns with respect to the smartphone, audio objects that were heard from straight ahead may start to be heard as being to one side or another of the user's head. In some cases, the audio signals can be transmitted to the headphones using the same wireless communication link used for the synchronization. Because of inherent lag between when the audio signal is initially transmitted from the smartphone and when the audio signal is played at the headphones, it can be important to rapidly and accurately predict movements of the headphones with respect to the smartphone so that the audio signals to be played at a particular position of the headphones with respect to the smartphone can be transmitted sufficiently before the headphones are moved to that particular position and/or orientation.

I. Computing Device and Accessory Environment

A. Overall Environment

FIG. 1 is a schematic diagram depicting a sensor synchronization environment 100 according to certain aspects of the present disclosure. The environment 100 can include multiple devices, such as one or more computing devices and one or more accessory devices. As depicted in FIG. 1, the environment 100 contains a smartphone 102, a set of headphones 112, and a set of earbuds 110. The smartphone 102 can be a computing device and the headphones 112 and earbuds 110 can be accessory devices. While the environment 100 of FIG. 1 is shown with a smartphone 102, any other suitable computing device can be used in place of a smartphone 102, such as a computer coupled to a display, a smart television, or any other suitable computing device.

The smartphone 102 can be coupled to the headphones 112 by a wireless communications link 108, such as a Bluetooth connection. The smartphone 102 can be coupled to the earbuds 110 by a wireless communications link 106, such as a Bluetooth connection. In some cases, the smartphone 102 can be coupled to one of the headphones 112 and earbuds 110 at a time, although that need not always be the case.

The smartphone 102 can present multimedia content 104. Multimedia content 104 can include video content displayed on a display 114 of the smartphone 102, however that need not always be the case. Examples of multimedia content 104 can include a video, an interactive video game, audio content (e.g., an immersive soundscape), or the like. In some cases, multimedia content 104 can include any combination of audio, visual, or tactile content. In some cases, a portion of the multimedia content 104 is presented by the smartphone 102 and another portion of the multimedia content 104 is transmitted via a wireless communication link 106, 108.

In the example depicted in FIG. 1, the multimedia content 104 is a video, the smartphone 102 is presenting visual content on the display 114, and audio content is transmitted over one or both of the wireless communication links 106, 108 to the earbuds 110 and/or headphones 112, respectively. In such an example, if a user facing the smartphone, the audio content that is presented by the headphones 112 may provide a spatial indication that particular sounds (e.g., a person talking) are coming from straight ahead. In this example, if the user were to turn his or her head to the right, the audio content that is presented by the headphones 112 may then provide a spatial indication that the particular sounds are coming from the left of their head. In such examples, a spatial indication of sounds coming from straight ahead may include presenting audio from the sound at approximately the same time and volume to both ears, whereas a spatial indication of a sound coming from the left of the head may include presenting a version of the audio to the left ear and a version of the audio that is quieter, delayed, and/or filtered to the right ear.

In another example, the smartphone 102 can present tactile content (e.g., vibrations) while audio content is being presented on the earbuds 110 and/or headphones 112. In another example, the smartphone 102 can present first audio content while second audio content is being presented on the earbuds 110 and/or headphones 112. In another example, the smartphone 102 can present visual content while an accessory device can present tactile content (e.g., spatially oriented vibrations to indicate the direction of the smartphone 102).

In some cases, the environment 100 can include a single computing device (e.g., smartphone 102) and a single accessory device (e.g., headphone 112 or earbuds 110). In some cases, the environment 100 can include multiple computing devices (e.g., multiple smart displays) and a single accessory device (e.g., headphone 112). In some cases, the environment 100 can include a single computing device (e.g., smartphone 102) and multiple accessory devices (e.g., headphone 112 and earbuds 110). In some cases, the environment 100 can include multiple computing devices and multiple accessory devices.

In the environment 100, computing devices (e.g., smartphone 102) can be spatially separated from accessory devices (e.g., headphone 112 or earbuds 110). In the environment 100, computing devices (e.g., smartphone 102) and accessory devices (e.g., headphone 112 or earbuds 110) can be free to move with respect to one another.

Figure 2:
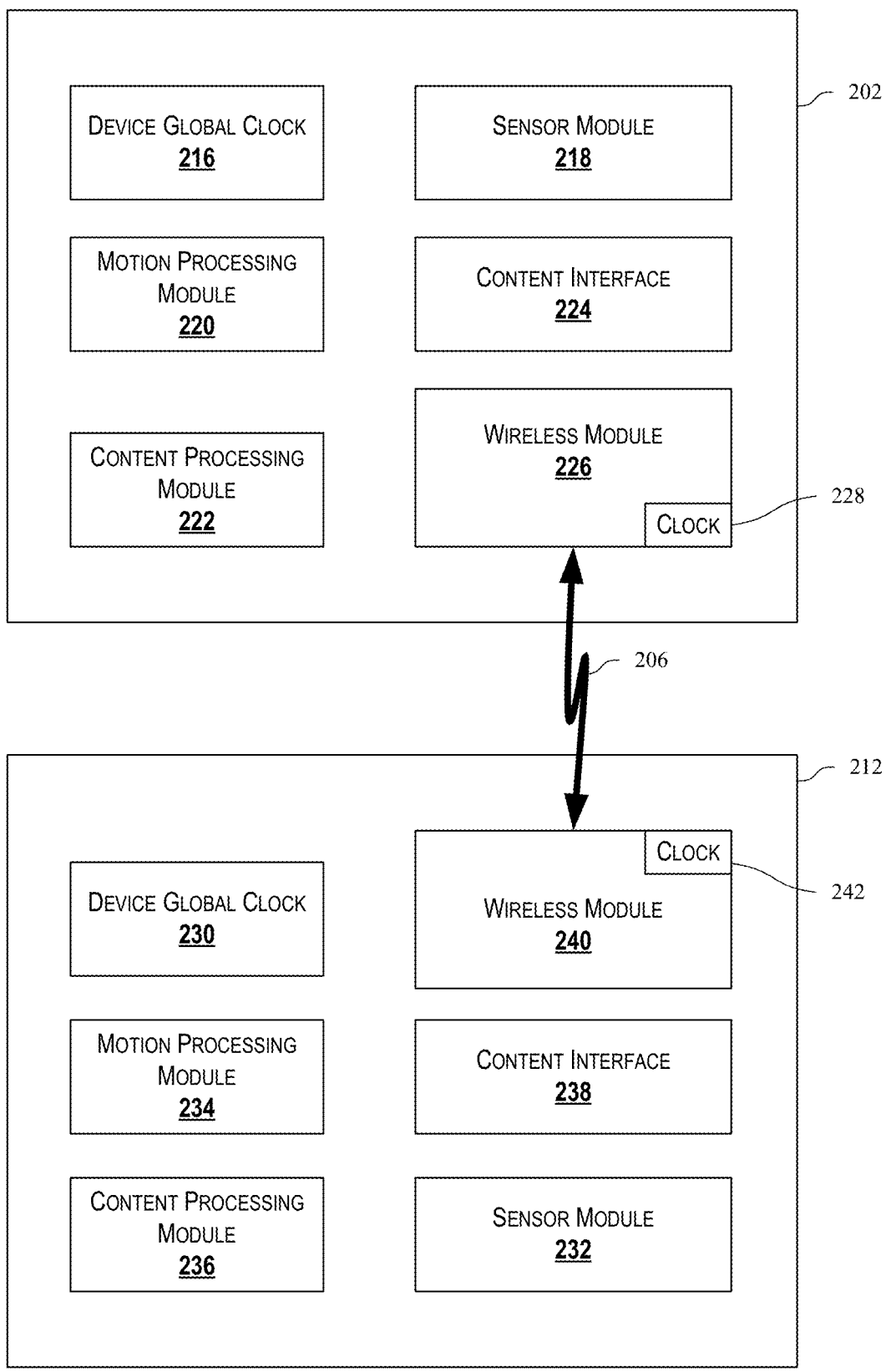
FIG. 2 is a block diagram depicting a computing device and an accessory device in a sensor synchronization environment according to certain aspects of the present disclosure.

FIG. 2 is a block diagram depicting a computing device 202 and an accessory device 212 in a sensor synchronization environment according to certain aspects of the present disclosure. Computing device 202 may be smartphone 102 of FIG. 1. Accessory device 212 may be headphones 112 or earbuds 110 of FIG. 1. Computing device 202 and accessory device 212 are communicatively coupled to one another via wireless communication link 206. The computing device 202 and accessory device 212 are described in further detail below.

B. Computing Device

Computing device 202 can be any suitable device for performing the functions of a computing device as described herein, such as a smartphone, a tablet computer, a laptop computer, a desktop computer, a smart television, a smart display device, or any other such devices. In some cases, a computing device 202 can be handheld or otherwise movable by a user, although that need not always be the case. A computing device 202 can have the following modules, which may be implemented in hardware, software, or a combination of hardware and software. The following modules may be implemented separately or combined in any suitable combination. The following modules may be interconnected as appropriate.

Computing device 202 can include a device global clock 216. The device global clock 216 can be a hardware or software clock (e.g., oscillator) that is used by various processes of the computing device 202. In some cases, the device global clock 216 can be used by the operating system of the computing device 202. The device global clock 216 may have a natural drift that is at or at least greater than 20 ppm (e.g., 20 microseconds of drift every second). In some cases, as described in further detail herein, the device global clock 216 can be periodically updated based on received offset information. The received offset information can refer to an offset between the device global clock 216 and another clock having a smaller drift than the device global clock 216, such as clock 228 of the wireless module 226. In some cases, a calibrated device global clock 216 (e.g., updated via received offset information) can have a drift that is less than 20 ppm, such as at or less than 15 ppm, 10 ppm, or 5 ppm.

Computing device 202 can include a sensor module 218. Sensor module 218 can include one or more sensors, which can be any suitable sensor for detecting and/or recording data. In some cases, sensor module 218 can include an IMU or any other position sensor. In some cases, sensor module 218 can include an imaging device, such as a camera or set of cameras. In some cases, sensor module 218 can include a ranging sensor (e.g., LIDAR), a light sensor, a heat sensor, or any other suitable sensor. In an example, sensor module 218 can include a face detection sensor comprising one or more cameras and one or more projectors (e.g., infrared pattern projectors). In some cases, sensor module 218 can include a face detection sensor and an IMU.

Sensor module 218 can generate timestamped sensor data. In some cases, the sensor module 218 can use the device global clock 216 to generate the time information that is associated with the collected sensor data, resulting in timestamped sensor data. In some cases, as described in further detail herein, the sensor module 218 can receive offset information and incorporate the offset information into the clock information from the device global clock 216 when generating the timestamped sensor data to generate preadjusted timestamped sensor data.

Computing device 202 can include a motion processing module 220. The motion processing module 220 can receive sensor data associated with the computing device 202, and optionally sensor data associated with the accessory device 212. The motion processing module 220 can be used to determine a position, an orientation, and/or motion of the computing device 202 individually, the accessory device 212 individually, and/or the computing device 202 with respect to the accessory device 212. In some cases, the motion processing module 220 can determine a predicted position, orientation, and/or motion. For example, the motion processing module 220 can receive sensor data associated with the computing device 202 and sensor data associated with the accessory device 212 and output a movement prediction. The motion processing module 220 can output motion data.

In some cases, the motion processing module 220 can receive synchronized sensor data, however that need not be the case. Motion processing module 220 can receive timestamped sensor data from sensor module 218 and timestamped sensor data from sensor module 232 and synchronize them together using received or calculated timing offset(s).

Computing device 202 can include a content processing module 222. The content processing module 222 can generate content to be presented at the computing device 202 and/or the accessory device 212. In some cases, content processing module 222 can be an audio processing module that is capable of generating immersive audio signals (e.g., spatial audio signals). Content processing module 222 can receive position, orientation, and/or motion data, such as a movement prediction from the motion processing module 220, and generate spatial content that is appropriate for the movement prediction. In some cases, content processing module 222 can facilitate presenting content locally via the content interface 224 (e.g., visual content) and presenting content remotely via the wireless communication link 206 (e.g., audio content presented at the content interface 238).

Computing device 202 can include a content interface 224. The content interface 224 can be any suitable interface for presenting content to a user. In some cases, content interface 224 can be a visual display, although other output devices can be used, such as speakers, tactile actuators, and the like. Content interface 224 can receive content to present at the computing device 202 from content processing module 222.

Computing device 202 can include a wireless module 226. The wireless module 226 can establish and maintain the wireless communication link 206. The wireless module 226 can be any suitable wireless module, such as a Bluetooth module (e.g., a wireless module capable of using Bluetooth wireless protocols). Wireless module 226 can receive content from the content processing module 222 and transmit the content to the accessory device 212 via the wireless communication link 206. In some cases, sensor data from sensor module 232 of the accessory device 212 can be received by the wireless module 226 via the wireless communication link 206, before being distributed as appropriate (e.g., to the motion processing module 220).

Wireless module 226 can include a clock 228. Clock 228 can be separate from the device global clock 216, although that need not always be the case. In some cases, clock 228 can have a drift that is smaller than the drift of the device global clock 216. In some cases, clock 228 can have a drift that is at or less than 20 ppm. Clock 228 can have a drift that is suitable for maintaining the wireless communication link 206.

C. Accessory Device

Accessory device 212 can be any suitable device for performing the functions of an accessory device as described herein, such as headphones, a headset, a set of earbuds, a single earbud, a set of speakers, a single speaker, a visual display, a tactile interface, or the like. The accessory device 212 can be capable of outputting any combination of one or more of audio, visual, or tactile content to a user. In some cases, an accessory device 212 can be wearable or otherwise mechanically coupled to a user, such as at the head or ear, although that need not always be the case. In some cases, the accessory device 212 can be coupled to the head of a user such that movement of the head of the user results in movement of the accessory device 212. An accessory device 212 can have the following modules, which may be implemented in hardware, software, or a combination of hardware and software. The following modules may be implemented separately or combined in any suitable combination. The following modules may be interconnected as appropriate.

Accessory device 212 can include a device global clock 230. The device global clock 230 can be a hardware or software clock (e.g., oscillator) that is used by various processes of the accessory device 212. In some cases, the device global clock 230 can be used by the operating system of the accessory device 212. The device global clock 230 may have a particular drift that is at or at least greater than 20 ppm. In some cases, as described in further detail herein, the device global clock 230 can be periodically updated based on received offset information. The received offset information can refer to an offset between the device global clock 230 and another clock having a smaller drift than the device global clock 230, such as clock 242 of the wireless module 240.

Accessory device 212 can include a sensor module 232. Sensor module 232 can include one or more sensors, which can be any suitable sensor for detecting and/or recording data. In some cases, sensor module 232 can include an IMU or any other position sensor. In some cases, sensor module 232 can include an imaging device, such as a camera or set of cameras. In some cases, sensor module 232 can include a ranging sensor (e.g., LIDAR), a light sensor, a heat sensor, or any other suitable sensor. In an example, sensor module 232 can include an IMU.

Sensor module 232 can generate timestamped sensor data. In some cases, the sensor module 232 can use the device global clock 230 to generate the time information that is associated with the collected sensor data, resulting in timestamped sensor data. In some cases, as described in further detail herein, the sensor module 232 can receive offset information and incorporate the offset information into the clock information from the device global clock 230 when generating the timestamped sensor data to generate preadjusted timestamped sensor data.

Accessory device 212 can include a motion processing module 234. The motion processing module 234 can receive sensor data associated with the accessory device 212, and optionally sensor data associated with the computing device 202. The motion processing module 234 can be used to determine a position, an orientation, and/or motion of the accessory device 212 individually, the computing device 202 individually, and/or the accessory device 212 with respect to the computing device 202. In some cases, the motion processing module 234 can determine a predicted position, orientation, and/or motion. For example, the motion processing module 234 can receive sensor data associated with the computing device 202 and sensor data associated with the accessory device 212 and output a movement prediction. The motion processing module 234 can output motion data.

In some cases, the motion processing module 234 can receive synchronized sensor data, however that need not be the case. Motion processing module 234 can receive timestamped sensor data from sensor module 218 and timestamped sensor data from sensor module 232 and synchronize them together using received or calculated timing offset(s). In some cases, however, the accessory device 212 does not have a motion processing module 234, with all motion processing occurring at motion processing module 220 of the computing device 202.

Accessory device 212 can include a content processing module 236. The content processing module 236 can generate content to be presented at the accessory device 212 and optionally at the computing device 202. In some cases, content processing module 236 can be an audio processing module that is capable of generating immersive audio signals (e.g., spatial audio signals). Content processing module 236 can receive position, orientation, and/or motion data, such as a movement prediction from the motion processing module 234 and/or from the computing device 202, and generate spatial content that is appropriate for the movement prediction. In some cases, content processing module 236 can generate content based on content received via the wireless communication link 206. For example, audio content received via the wireless communication link 206 can be manipulated to generate immersive audio signals. In some cases, the content processing module 236 can apply effects (e.g., attenuation, delay, and/or filtering) to a received audio signal to generate immersive audio appropriate to a particular movement prediction or other motion data. In some cases, the content processing module 236 can select and/or mix audio signals from a set of multiple audio signals to generate immersive audio appropriate to a particular movement prediction or other motion data. For example, the content processing module 236 may receive a set of audio channels that include more than two channels of audio content from the computing device 202 (e.g., via wireless communication link 206), and use the movement prediction to select and/or mix audio channels from the set of audio channels to generate the immersive audio (e.g., a stereo audio signal appropriate for the movement prediction). In some cases, however, the accessory device 212 does not have a content processing module 236, with all content processing occurring at content processing module 222 of the computing device 202.

Accessory device 212 can include a content interface 238. The content interface 238 can be any suitable interface for presenting content to a user. In some cases, content interface 238 can be an audio output (e.g., speaker or set of speakers), although other output devices can be used, such as visual displays, tactile actuators, and the like. In some cases, content interface 238 can receive content to present at the accessory device 212 from content processing module 222 of the computing device 202 via the wireless communication link 206. In some cases, however, content interface 238 can receive content to present at the accessory device 212 from content processing module 236 of the accessory device 212.

Accessory device 212 can include a wireless module 240. The wireless module 240 can establish and maintain the wireless communication link 206. The wireless module 240 can be any suitable wireless module, such as a Bluetooth module (e.g., a wireless module capable of using Bluetooth wireless protocols). Wireless module 240 can receive content from the computing device 202 via the wireless communication link 206 and relay the content to the content interface 238. In some cases, wireless module 240 can receive sensor data from sensor module 232 and transmit the sensor data to the computing device 202 via the wireless communication link 206. In some cases, sensor data from sensor module 218 of the computing device 202 can be received by the wireless module 240 via the wireless communication link 206, before being distributed as appropriate (e.g., to the motion processing module 234).

Wireless module 240 can include a clock 242. Clock 242 can be separate from the device global clock 230, although that need not always be the case. In some cases, clock 242 can have a drift that is smaller than the drift of the device global clock 230. In some cases, clock 242 can have a drift that is at or less than 20 ppm. Clock 242 can have a drift that is suitable for maintaining the wireless communication link 206.

II. Time Synchronization

Figure 3:
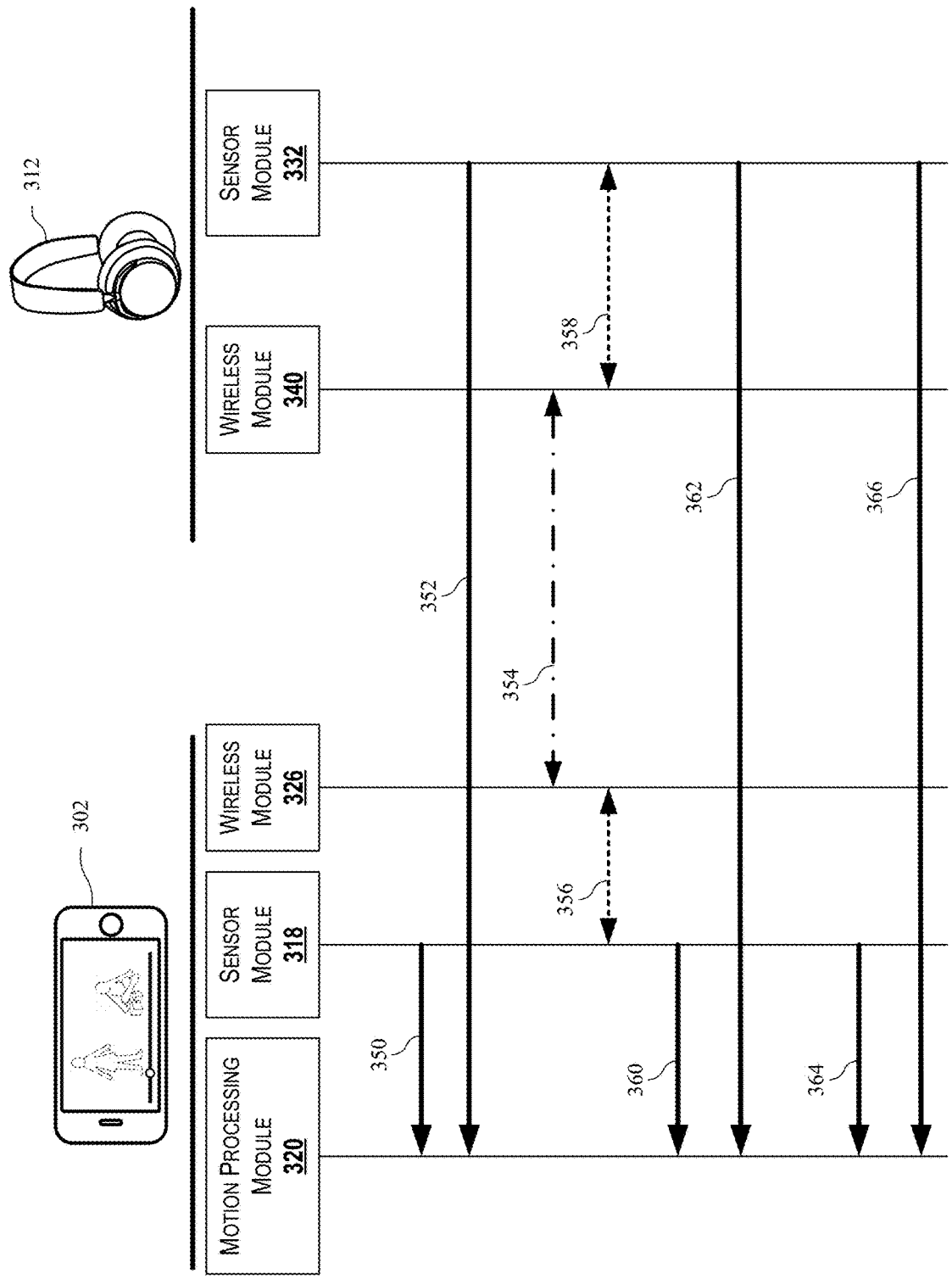
FIG. 3 is a schematic diagram showing communication paths between a computing device and an accessory device according to certain aspects of the present disclosure.

FIG. 3 is a schematic diagram showing communication paths between a computing device 302 and an accessory device 312 according to certain aspects of the present disclosure. Computing device 302 can be computing device 202 of FIG. 2. Accessory device 312 can be accessory device 212 of FIG. 2. FIG. 3 depicts certain communication paths of certain aspects of the present disclosure, although other communication paths may be used.

With reference to FIG. 3, there exists three different timing domains: a computing device clock domain, an accessory device clock domain, and a wireless clock domain. Processes or data that are based on the device global clock of the computing device 302 can be referred to as being within the computing device clock domain. Processes or data that are based on the device global clock of the accessory device 312 can be referred to as being within the accessory device clock domain. Processes or data that are based on the clock of a wireless module 326, 340 used to establish and/or maintain the wireless communication link between the computing device 302 and the accessory device 312 can be referred to as within the wireless clock domain.

Path 350 represents timestamped sensor data from sensor module 318 that is sent to the motion processing module 320. The timestamped sensor data from path 350 can be based on the device global clock of the computing device 302, and therefore can be in the computing device clock domain.

Path 352 represents timestamped sensor data from sensor module 332 that is sent to the motion processing module 320 (e.g., via the wireless communication link). The timestamped sensor data from path 352 can be based on the device global clock of the accessory device 312, and therefore can be in the accessory device clock domain.

Path 354 represents communications between wireless module 326 of the computing device 302 and wireless module 340 of the accessory device 312. The communications on path 354 can be carried out within the wireless clock domain. The clocks that maintain the wireless communication path (e.g., the clocks of wireless modules 326, 340) can have a drift of at or less than 20 ppm.

A. Determining Timing Offset

A timing offset 356 is illustrated between wireless module 326 and sensor module 318 to indicate the timing offset between the wireless clock domain and the computing device clock domain. A timing offset 358 is illustrated between wireless module 340 and sensor module 332 to indicate the timing offset between the wireless clock domain and the accessory device clock domain.

Timing offsets 356, 358 can be obtained once or can be obtained repeatedly. Determining a timing offset can include correlating a timestamp from sensor data with a timestamp of the clock of a wireless module. In some cases, a timing offset can be calculated based on comparing wireless communication link clock data (e.g., information regarding the clock of a wireless module) and device-specific clock data (e.g., information regarding a device global clock). By comparing the clock of the wireless module with a device global clock, a timing offset can be approximated. Since the clock of the wireless module has a relatively smaller drift than a device global clock, the timing offset is expected to change over time as the device global clock drifts further than that of the clock of the wireless module. Additionally, since the clock of wireless module 340 and the clock of wireless module 326 can be assumed to be synchronized (e.g., due to establishment and maintenance of the wireless communication link), the relationships between the device global clocks of the computing device 302 and accessory device 312 can be determined.

B. Synchronization Via Correcting Received Timestamped Data

In some cases, the motion processing module 320 can make use of timing offsets 356, 358 to make adjustments to the timestamped sensor data received via path 350 and/or the timestamped sensor data received via path 352, to move all timestamps to a single clock domain.

For example, data can be translated between the computing device clock domain and the wireless clock domain using timing offset 356, and data can be translated between the accessory device clock domain and the wireless clock domain using timing offset 358. Thus, data can be translated between the computing device clock domain and the accessory device clock domain (e.g., by using both timing offsets 356, 358). In some cases, information regarding the wireless communication link itself (e.g., information of path 354) can also be used to account for transmission delays.

C. Synchronization Via Periodic Global Clock Corrections

In some cases, the timing offsets 356, 358 can be used to adjust one or more of the device global clocks of the computing device 302 and accessory device 312, respectively. In such examples, paths 350, 352 may be unused. Instead, the device global clocks of the computing device 302 and/or the accessory device 312 can be adjusted using the respective timing offsets 356, 358. For example, the device global clock of the accessory device can be brought into the wireless clock domain by adjusting the device global clock of the accessory device by timing offset 358, or brought into the computing device clock domain by adjusting the global clock of the accessory device by timing offsets 356, 358. In another example, the device global clock of the computing device can be brought into the wireless clock domain by adjusting the device global clock of the computing device by timing offset 356, or brought into the accessory device clock domain by adjusting the global clock of the computing device by timing offsets 356, 358. In some cases, adjustments are made periodically to account for greater drift in the device global clocks of the computing device and accessory device, with respect to the clock of the wireless modules 326, 340. In some cases, it can be desirable to bring the accessory device to the wireless clock domain or the computing device clock domain. In some cases, information regarding the wireless communication link itself (e.g., information of path 354) can also be used to account for transmission delays.

As depicted in the middle portion of FIG. 3, the global clock domains of the computing device and accessory device are brought together (e.g., to the computing device clock domain, to the wireless clock domain, or to the accessory device clock domain) before paths 360, 362 occur. Path 360 represents timestamped sensor data from sensor module 318 that is sent to the motion processing module 320. Path 362 represents timestamped sensor data from sensor module 332 that is sent to the motion processing module 320 (e.g., via the wireless communication link). Because of the prior synchronization of the device global clocks of the computing device 302 and accessory device 312, the timestamped sensor data from path 360 and the timestamped sensor data from path 362 are generated in synchronized clock domains, and are thus already synchronized, needing no further synchronization at the motion processing module 320.

D. Synchronization Via Pre-Adjusted Timestamps

In some cases, the timing offsets 356, 358 can be used by one or more of the sensor modules 318, 332 to generate pre-adjusted timestamped sensor data. In such cases, a sensor module (e.g., sensor module 318 and/or sensor module 332) can timestamp sensor data by using the current time of its respective device global clock and offsetting that time using one or more timing offsets 356, 358, resulting in timestamped sensor data that has been pre-adjusted to a different clock domain than that of the device global clock associated with that particular sensor module.

For example, sensor module 332 can receive information regarding timing offsets 356, 358. When generating the timestamped sensor data, sensor module 332 can start with the current time of the device global clock of the accessory device 312 and offset it using the timing offsets 356, 358. Thus, timestamped sensor data generated at sensor module 332 will already be in the computing device clock domain upon generation. Timestamped sensor data generated at sensor module 318 can be similarly pre-adjusted so that it is generated already in the accessory device clock domain. In some cases, timestamped sensor data generated at both sensor modules 318, 332 can be similarly pre-adjusted using respective timing offsets 356, 358 so that the resultant timestamped sensor data is generated already in the wireless clock domain.

As depicted in the lower portion of FIG. 3, one or more of the sensor modules 318, 332 use one or more timing offsets 356, 358 to pre-adjust the timestamps during generation of timestamped sensor data. Path 364 represents timestamped sensor data from sensor module 318 that is sent to the motion processing module 320. Path 366 represents timestamped sensor data from sensor module 332 that is sent to the motion processing module 320 (e.g., via the wireless communication link). In one example, sensor module 332 can pre-adjust its timestamps using the timing offsets 356, 358. As a result, the timestamped sensor data from path 364 and the timestamped sensor data from path 366 can both be in the computing device clock domain, with the former naturally in the computing device clock domain and the latter being pre-adjusted during generation of the timestamped sensor data to be in the computing device clock domain. Since all timestamped sensor data is in the same clock domain, they are already synchronized, needing no further synchronization at the motion processing module 320.

E. Synchronization Processes

Figure 4:
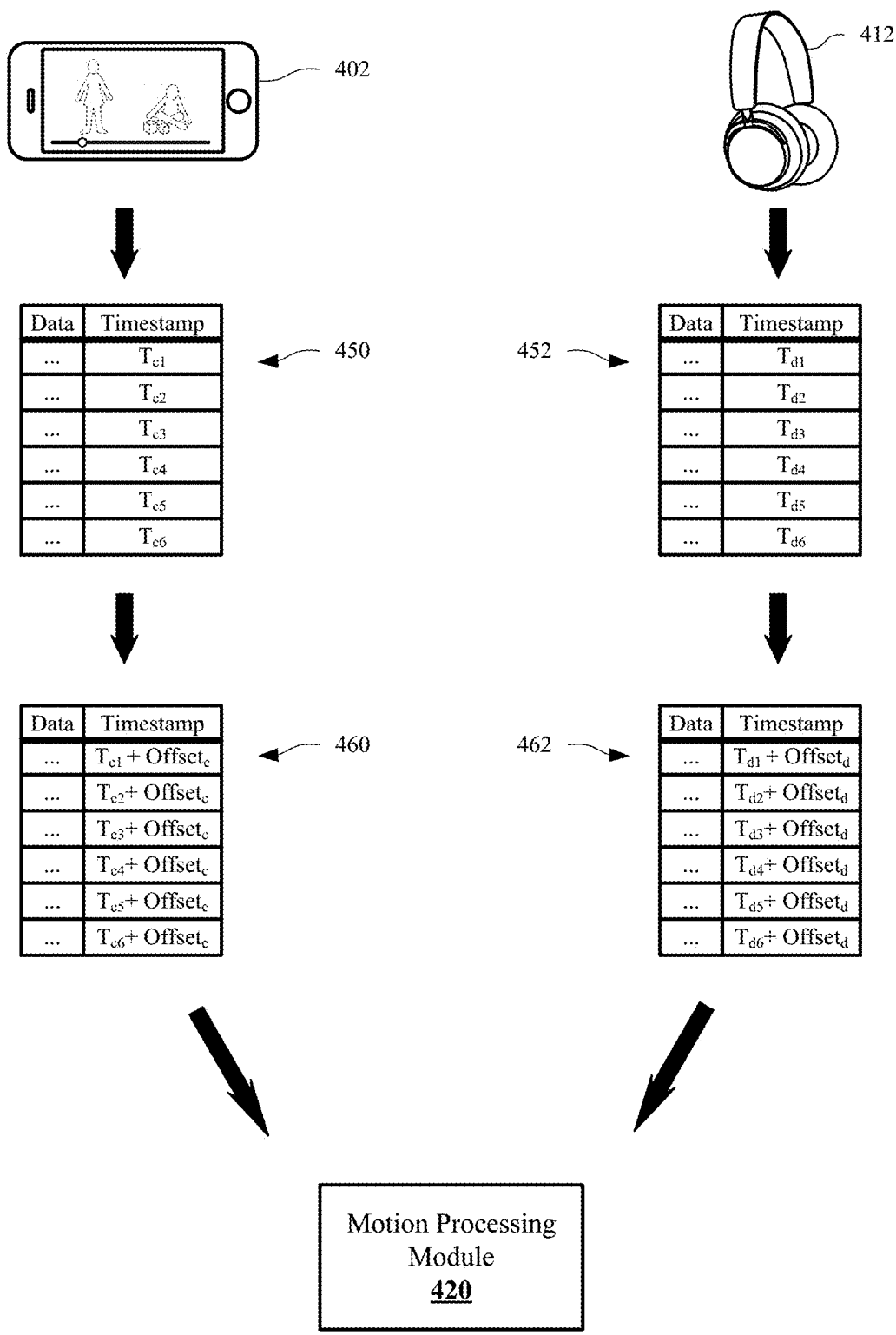
FIG. 4 is a schematic diagram showing multiple sets of timestamped data and corrected timestamps according to certain aspects of the present disclosure.

FIG. 4 is a schematic diagram showing multiple sets of timestamped data 450, 452 and adjusted timestamped data 460, 462 according to certain aspects of the present disclosure. Smartphone 402 can be computing device 202 of FIG. 2. Headphones 412 can be accessory device 212 of FIG. 2.

As depicted in FIG. 4, sets of timestamped data 450, 452 can be generated and then later adjusted into adjusted timestamped data 460, 462. In some cases, however, one or more of the sets of timestamped data 450, 452 may not be generated, with the respective set(s) of adjusted timestamped data 460, 462 acting as a set of pre-adjusted timestamped data. Additionally, in some cases, only one of the sets of adjusted timestamped data 460, 462 may be generated, with its offset being sufficient to bring that set of adjusted timestamped data into the clock domain of the set of timestamped data 450, 452 for which no set of adjusted timestamped data was generated.

In the example depicted in FIG. 4, smartphone 402 generates a set of timestamped data 450 that conveys sensor data associated with timestamps based on a device global clock of the smartphone 402. The timestamps (e.g., $T_{c1}$ through $T_{c6}$) are in the computing device clock domain. Likewise, headphones 412 generate a set of timestamped data 452 that conveys sensor data associated with timestamps based on a device global clock of the headphones 412. The timestamps (e.g., $T_{d1}$ through $T_{d6}$) are in the accessory device clock domain.

After generation of the set of timestamped data 450, the smartphone 402 can apply a timing offset to each timestamp of the set of timestamped data 450 to generate a set of adjusted timestamped data 460. The timing offset used by smartphone 402 (e.g., Offset) can be timing offset 356 of FIG. 3. Likewise, after generation of the set of timestamped data 452, the headphones 412 can apply a timing offset to each timestamp of the set of timestamped data 452 to generate a set of adjusted timestamped data 462. The timing offset used by headphones 412 (e.g., $Offset_d$) can be timing offset 358 of FIG. 3.

In some cases, the generation of the sets of adjusted timestamped data 460, 462 can occur within a motion processing module (e.g., motion processing module 220 or motion processing module 243 of FIG. 2). In other cases, however, such as that illustrated in FIG. 4, the sets of adjusted timestamped data 460, 462 can be provided to a motion processing module 420. Motion processing module 420 can be motion processing module 220 or motion processing module 243 of FIG. 2.

Figure 5:
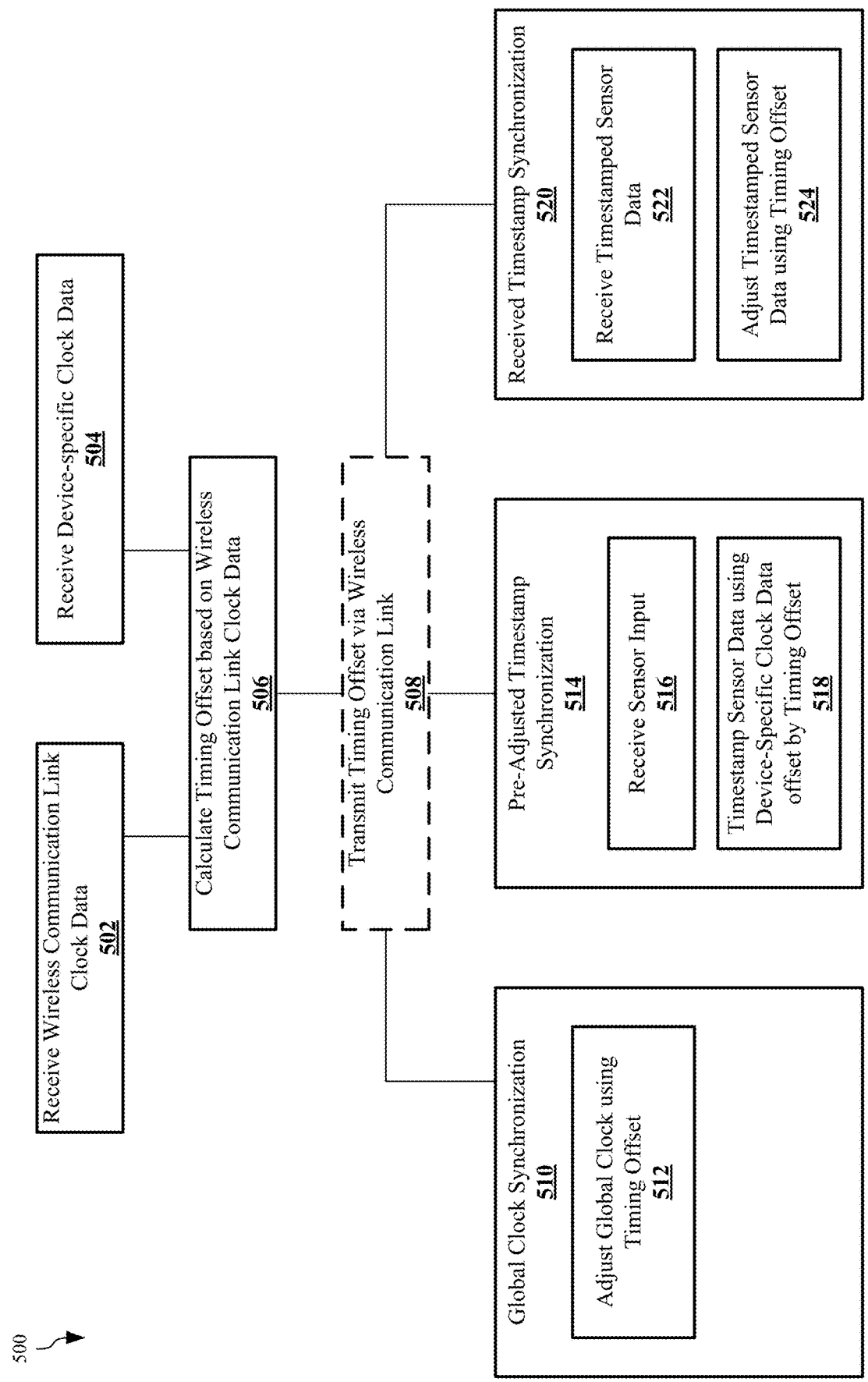
FIG. 5 is a flowchart depicting a process of synchronizing sensor data according to certain aspects of the present disclosure.

FIG. 5 is a flowchart depicting a process 500 of synchronizing sensor data according to certain aspects of the present disclosure. The process 500 can make use of a computing device and an accessory device, such as computing device 202 and accessory device 212 of FIG. 2. Certain blocks can occur at either accessory device or a computing device, or both.

At block 502, wireless communication link clock data can be received. Receiving wireless communication link clock data can involve receiving a current timestamp associated with the clock of a wireless module.

At block 504, device-specific clock data can be received. Receiving device-specific clock data can involve receiving a current timestamp associated with a device global clock.

At block 506, a timing offset can be calculated based on the wireless communication link clock data and the device-specific clock data. The timing offset can be one or both of timing offsets 356, 358 of FIG. 3. In some cases, the timing offset can include information related to a transmission delay in the wireless communication link.

In some cases, blocks 502, 504, 506 can occur at either accessory device or a computing device. In some cases, at optional block 508, the timing offset calculated at block 506 can be transmitted via the wireless communication link. However, if the timing offset is not transmitted via the wireless communication link, the timing offset can be used locally by the device upon which the timing offset is calculated. In some cases, blocks 502, 504, 506 can be performed by both the computing device and the accessory device to obtain timing offsets necessary for each of the computing device and accessory device to translate data in the respective devices' clock domains to a wireless clock domain.

After a timing offset has been calculated at block 506, and optionally after a timing offset has been transmitted at block 508, clock synchronization can occur using one or a combination of blocks 510, 514, 520.

At block 510, synchronization occurs using global clock synchronization. Global clock synchronization can involve adjusting a device global clock at block 512 using the timing offset. In such cases, the result of adjusting the device global clock at block 512 can cause all sensor data created at the sensor relying on that particular device global clock to be generated in either the other device's clock domain (e.g., if both timing offsets 356, 358 are used) or in a wireless clock domain (e.g., if a single timing offset 356, 358 is used). In some cases, global clock synchronization at block 510 can thus ensure that all timestamped sensor data is generated in the same clock domain. Global clock synchronization at block 510 can occur on one or both of the computing device and accessory device. Global clock synchronization can be associated with paths 360, 362 of FIG. 3.

At block 514, pre-adjusted timestamp synchronization can occur. Pre-adjusted timestamp synchronization at block 514 can involve receiving sensor input at block 516 and then timestamping the data from the sensor input using both the device-specific clock data (e.g., from that device's device global clock) and a timing offset at block 518. By offsetting the device-specific clock data, the resultant timestamped sensor data from block 514 can be pre-adjusted to another device's clock domain (e.g., if both timing offsets 356, 358 are used) or to a wireless clock domain (e.g., if a single timing offset 356, 358 is used). In some cases, pre-adjusted timestamp synchronization can thus ensure that all timestamped sensor data is generated in the same clock domain. Pre-adjusted timestamp synchronization can occur on one or both of the computing device and accessory device. Pre-adjusted timestamp synchronization can occur at a sensor module of a device. Pre-adjusted timestamp synchronization can be associated with paths 364, 366 of FIG. 3.

At block 520, received timestamp synchronization can occur. Received timestamp synchronization can involve receiving timestamped sensor data at block 522 and adjusting that timestamped sensor data using a timing offset at block 524. By adjusting the timestamped sensor data using timing offset(s), the resultant adjusted timestamped sensor data from block 520 can be translated to another device's clock domain (e.g., if both timing offsets 356, 358 are used) or to a wireless clock domain (e.g., if a single timing offset 356, 358 is used). In some cases, received timestamp synchronization at block 520 can ensure that all timestamped sensor data is generated in the same clock domain. Received timestamp synchronization at block 520 can occur on one or both of the computing device and accessory device. Received timestamp synchronization at block 520 can occur at a motion processing module of a device. Received timestamp synchronization can be associated with paths 350, 352 of FIG. 3.

III. Generating and Presenting Spatial Audio

A. Generating Spatial Audio from Real-Time Sensor Data

FIG. 6 is a flowchart depicting a process 600 of generating immersive spatial audio using synchronized sensor data according to certain aspects of the present disclosure. Process 600 can occur on a computing device or an accessory device, such as computing device 202 or accessory device 212 of FIG. 2.

At block 602, first sensor data is received. The first sensor data can be associated with the computing device. This first sensor data can be received from a sensor module of the computing device. In an example, the first sensor data can be IMU data. In some cases, the first sensor data can be transmitted locally to a motion processing module, although that need not always be the case.

At block 604, second sensor data can be received. The second sensor data can be associated with the accessory device. This second sensor data can be received from a sensor module of the accessory device. In an example, the second sensor data can be IMU data. In some cases, the second sensor data can be received via the wireless communication link, although that need not always be the case.

At block 606, the first sensor data and second sensor data can be synchronized. Synchronization can occur in any suitable form, such as with reference to block 510, 514, 520 of FIG. 5. In some cases, synchronizing the first sensor data and second sensor data can involve adjusting one or both of the first sensor data and the second sensor data by applying one or more timing offsets to the timestamps of the sensor data to change the clock domain of that sensor data. In some cases, the first sensor data and/or second sensor data can be pre-adjusted before being received at blocks 602, 604, in which case synchronizing at block 606 simply involves matching the timestamps of the first sensor data and the second sensor data.

At block 608, a relative position of the accessory device with respect to the computing device is calculated. Calculating this relative position can use the synchronized first sensor data and second sensor data from block 606.

B. Predicting Future Movements and Generating Spatial Audio from Movement Predictions At optional block 610, a movement prediction can be generated. Generation of the movement prediction can be based on the synchronized first sensor data and second sensor data of block 606. In some cases, generation of the movement prediction can be based on calculation of the relative position at block 608. In some cases, generation of a movement prediction further involves comparing synchronized sensor data and/or relative position with historical data (e.g., data from a recent timeframe or a limited number of recent pieces of data). The movement prediction can be a prediction of a future relative position of the accessory device with respect to the computing device.

At block 612, immersive spatial audio is generate based on the motion data from one or more of blocks 608, 610 (e.g., the relative position from block 608 and/or the movement prediction of block 610). Generation of the immersive spatial audio can involve adjusting an audio signal (e.g., a stereo audio signal) to account for movement of the user's ears with respect to the perceived audio source. For example, for a perceived audio source positioned directly in front of a user, turning of the user's head to the right may require generation of a stereo audio signal that causes the user to perceive the perceived audio source as coming from the user's left side. In other words, for a user facing a display of a computing device, accounting for movement of the user's ears would result in a perceived audio source that is being presented on the display (e.g., a video of an individual speaking) always sounding as if it were coming from the direction of the computing device, regardless of movement of the user's head in various directions.

Generation of immersive spatial audio at block 612 can occur in real-time. In cases where a movement prediction is generated at block 610, generation of immersive spatial audio in real-time at block 612 may include generating immersive spatial audio designed to be presented in the near future (e.g., within ones, tens, or hundreds of milliseconds) at a time when the user's head is expected to be in the position predicted by the movement prediction.

In some cases, in order to achieve accurate movement prediction at block 610 and/or accurate generation of immersive spatial audio at block 612, the clock drift between the sensor modules of the computing device and the accessory device may be at or below 10 ppm, although that need not always be the case.

C. Processing Spatial Audio on Computing Device

FIG. 7 is a flowchart depicting a process 700 for generating spatial audio signals on a computing device according to certain aspects of the present disclosure. Process 700 can occur on a computing device, such as computing device 202 of FIG. 2. As depicted in FIG. 7, the immersive audio signals are generated on a computing device and then transmitted to an accessory device.

At block 702, an audio signal related to content presented on a computing device can be transmitted to an accessory device. In some cases, content other than an audio signal can be transmitted. In some cases, the content being presented on the computing device can be visual content that correlates with the audio signal. The audio signal at block 702 can be an immersive, spatial audio signal (e.g., stereo audio) based on an initial position of the accessory device with respect to the computing device. For example, the audio signal at block 702 can relate to a perceived audio source located directly in front of the user's head.

At block 704, position information related to a relative position of the accessory device with respect to the computing device is received. This position information can include motion information, such as a relative position of the accessory device with respect to the computing device, or a movement prediction. The position information can be indicative of a new position of the accessory device with respect to the computing device. The position information can be obtained through any suitable technique, including process 600 of FIG. 6 (e.g., block 608, 601). In some cases, the position information is received from a motion processing module of the computing device.

At block 706, an updated audio signal is generated based on the position information from block 704. The updated audio signal can be generated to account for a difference between the initial position of block 702 and the new position at block 704. For example, if the new position at block 704 is a 90° turn to the right, the updated audio signal at block 706 may cause the perceived audio source to be perceived as located directly to the left of the user's head.

At block 708, the updated audio signal is transmitted to the accessory device. In some cases, the updated audio signal is transmitted across the same wireless communication link used to synchronize sensor data between the computing device and accessory device in the determining of the position information received at block 704.

D. Processing Spatial Audio on Accessory Device

FIG. 8 is a flowchart depicting a process 800 for generating spatial audio signals on an accessory device according to certain aspects of the present disclosure. Process 800 can occur on an accessory device, such as accessory device 212 of FIG. 2. As depicted in FIG. 8, the immersive audio signals are generated on the accessory device using audio signals received from the computing device.

At block 802, an audio signal related to content presented on a computing device can be received at an accessory device. In some cases, content other than an audio signal can be received. In some cases, the content being presented on the computing device can be visual content that correlates with the audio signal. The audio signal at block 802 can be an immersive, spatial audio signal (e.g., stereo audio) based on an initial position of the accessory device with respect to the computing device. For example, the audio signal at block 802 can relate to a perceived audio source located directly in front of the user's head.

In some cases, the audio signal received at block 802 can include a set of three or more audio channels designed to be mixable into various immersive audio signals. The set of three or more audio channels can be designed such that fewer than all of the set of three or more audio channels is intended to be presented to a user at a time.

At block 804, position information related to a relative position of the accessory device with respect to the computing device is received. This position information can include motion information, such as a relative position of the accessory device with respect to the computing device, or a movement prediction. The position information can be indicative of a new position of the accessory device with respect to the computing device. The position information can be obtained through any suitable technique, including process 600 of FIG. 6 (e.g., block 608, 601). In some cases, the position information is received from a motion processing module of the computing device via a wireless connection link. In some cases, the position information is received from a motion processing module of the accessory device.

In some cases, the audio signal received at block 802 is received via the same wireless communication link used to synchronize sensor data between the computing device and accessory device in the determining of the position information received at block 804.

At block 806, an updated audio signal can be generated based on the position information from block 804. The updated audio signal can be generated to account for a difference between the initial position of block 802 and the new position at block 804. For example, if the new position at block 804 is a 90° turn to the right, the updated audio signal at block 806 may cause the perceived audio source to be perceived as located directly to the left of the user's head.

In some cases, generating the updated audio signal at block 806 can involve mixing selected portions (e.g., sub-signals) of the audio signal of block 802 into an updated audio signal at block 808. In such cases, mixing at block 808 can involve selecting fewer than all of a set of three or more audio channels (e.g., sub-signals) from the audio signal and mixing the selected channels into an updated audio signal. Mixing at block 808 can involve interpolating multiple audio channels (e.g., sub-signals) from the audio signal.

In some cases, generating the updated audio signal at block 806 can involve applying audio effects to the audio signal to generate the updated audio signal at block 810. In such cases, the audio signal from block 802 can be adjusted through one or more of amplification, delay, filtering, or other audio effects to achieve a desired audio signal.

In some cases, generating the updated audio signal at block 806 can involve a combination of block 808, 810.

In some cases, the updated audio signal can be received from the computing device. This updated audio signal may be directly presented to the accessory device at block 812.

At block 808, the updated audio signal is presented at the accessory device. Presenting the audio signal at block 808 can include playing the audio signal through speaker(s) of the accessory device. In cases where content other than an audio signal is used, the content can be presented using any suitable technique.

IV. Example Use Case (3D Spatial Audio of an Immersive Video)

Figure 9:
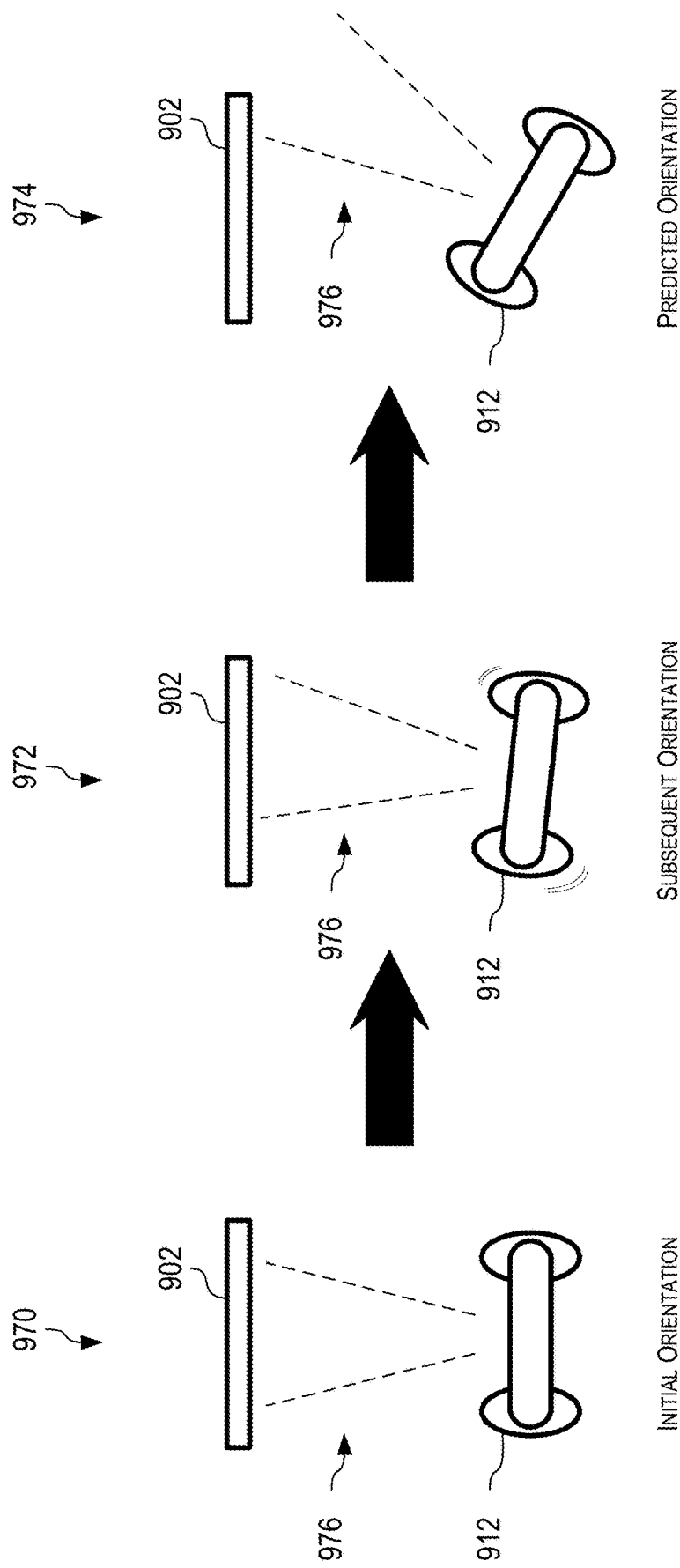
FIG. 9 is a set of progressive schematic images depicting a computing device and an accessory device in an initial orientation, in a subsequent orientation, and in a predicted orientation according to certain aspects of the present disclosure.

FIG. 9 is a set of progressive top-view, schematic images depicting a computing device 902 and an accessory device 912 in an initial orientation 907, in a subsequent orientation 972, and in a predicted orientation 974 according to certain aspects of the present disclosure. The computing device 902 and accessory device 912 can be computing device 202 and accessory device 212 of FIG. 2.

As depicted in FIG. 9, the computing device 902 is a smartphone and the accessory device 912 is headphones, viewed from the top. The user's head is not shown for illustrative purposes. In each orientation, the orientation of the accessory device 912 (e.g. headphones) is correlated with a viewing direction 976 (e.g., facing direction) of a hypothetical user wearing the accessory device 912. FIG. 9 advances in time from left to right.

In the initial orientation, the user can be facing the computing device 902, with viewing direction 976 pointing directly towards the content being presented on the computing device 902. At this time, the audio signals being presented by the accessory device 912 can be designed to cause a perceived audio source to be heard from the computing device 902, which is directly in the path of the viewing direction 976, since the user is facing the computing device 902 (e.g., as identified by the position of the accessory device 912 with respect to the computing device 902).

In the subsequent orientation 972, the user is beginning to move from the initial orientation 970 towards the predicted orientation 974. During this subsequent orientation 972, the accessory device 912 has changed in position with respect to the computing device 902. In this subsequent orientation 972, the user's viewing direction 976 is starting to move to the right of the computing device 902, which equates to the content being presented on the computing device 902 as being on the left side of the hypothetical user's head.

During and/or immediately following this subsequent orientation 972, the computing device 902 and/or accessory device 912 can generate an updated audio signal. Generating the updated audio signal can occur as described herein, such as with reference to processes 700, 800 of FIGS. 7, 8, respectively. Generating these updated audio signals can be based on a movement prediction, such as a movement prediction generated using process 600 of FIG. 6. The movement prediction that is generated during and/or immediately following the subsequent orientation 972 is indicative of the predicted orientation 974. Therefore, before the user's head reaches the predicted orientation 974, the computing device 902 and/or accessory device 912 are already predicting that the user's head will end up at the predicted orientation 974.

Once a predicted orientation 974 is predicted by the computing device 902 and/or accessory device 912, which occurs during and/or immediately following the subsequent orientation 972 and before the user actually reaches the predicted orientation 974, the immersive audio signals associated with the predicted orientation 974 are generated and transmitted to the accessory device 912. These immersive audio signals can include audio signals designed to cause a user to perceive the perceived audio source as coming from the computing device 902, and thus perceived as coming from the left of the viewing direction 976.

By the time the user reaches the predicted orientation 974, or at least within 100 ms, 90 ms, 80 ms, 70 ms, 60 ms, or 50 ms of that time, the immersive audio signals are presented at the accessory device 912, thus providing a seamless, immersive experience without substantial or noticeable lag in the spatial orientation of the audio signals.

V. Example Device

Figure 10:
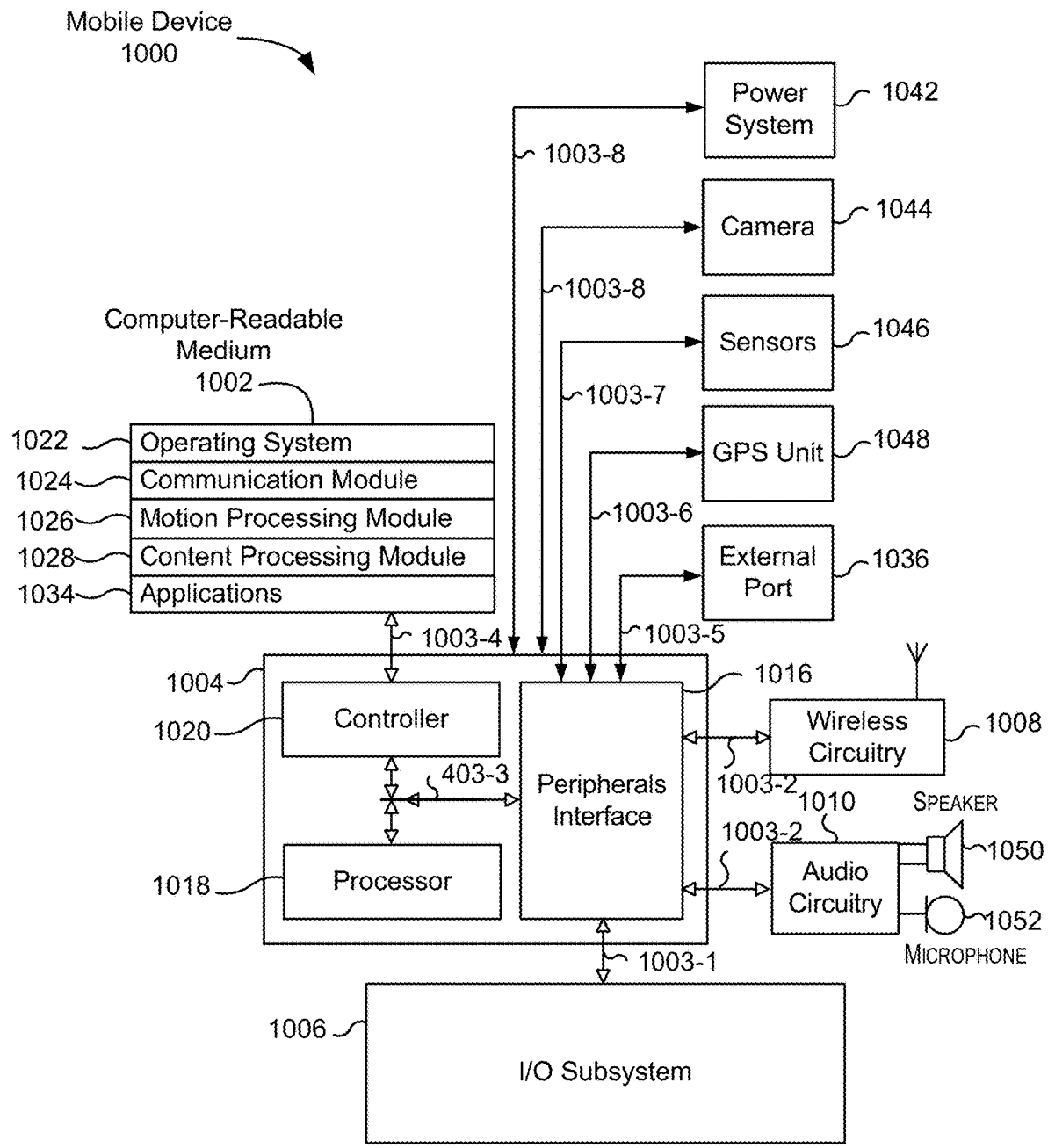
FIG. 10 is a block diagram of an example device 1000, which may be a mobile device, using a data structure according to certain aspects of the present disclosure.

FIG. 10 is a block diagram of an example device 1000, which may be a mobile device, using a data structure according to certain aspects of the present disclosure. Device 1000 generally includes computer-readable medium 1002, a processing system 1004, an Input/Output (I/O) subsystem 1006, wireless circuitry 1008, and audio circuitry 1010 including speaker 1050 and microphone 1052. These components may be coupled by one or more communication buses or signal lines 1003. Device 1000 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a car display unit, headphones, or the like, including a combination of two or more of these items. Example device 1000 can be used as a computing device (e.g. computing device 202 of FIG. 2) and/or an accessory device (e.g., accessory device 212 of FIG. 2).

It should be apparent that the architecture shown in FIG. 10 is only one example of an architecture for device 1000, and that device 1000 can have more or fewer components than shown, or a different configuration of components. The various components shown in FIG. 10 can be implemented in hardware, software, or a combination of both hardware and software, including one or more signal processing and/or application specific integrated circuits.

Wireless circuitry 1008 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 1008 can use various protocols, e.g., as described herein. For example, wireless circuitry 1008 can have one component for one wireless protocol (e.g., Bluetooth®) and a separate component for another wireless protocol (e.g., UWB). Different antennas can be used for the different protocols. Wireless circuitry 1008 can be a wireless modules, such as wireless modules 226, 240 of FIG. 2.

Wireless circuitry 1008 is coupled to processing system 1004 via peripherals interface 1016. Interface 1016 can include conventional components for establishing and maintaining communication between peripherals and processing system 1004. Voice and data information received by wireless circuitry 1008 (e.g., in speech recognition or voice command applications) is sent to one or more processors 1018 via peripherals interface 1016. One or more processors 1018 are configurable to process various data formats for one or more application programs 1034 stored on medium 1002.

Peripherals interface 1016 couple the input and output peripherals of the device to processor 1018 and computer-readable medium 1002. One or more processors 1018 communicate with computer-readable medium 1002 via a controller 1020. Computer-readable medium 1002 can be any device or medium that can store code and/or data for use by one or more processors 1018. Medium 1002 can include a memory hierarchy, including cache, main memory and secondary memory.

Device 1000 also includes a power system 1042 for powering the various hardware components. Power system 1042 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1000 includes a camera 1044. In some embodiments, device 1000 includes sensors 1046. Sensors 1046 can include accelerometers, compasses, gyroscopes, pressure sensors, audio sensors, light sensors, barometers, and the like. Sensors 1046 can be used to sense position aspects, such as auditory or light signatures of a position and/or orientation. Sensors 1046 can be used to obtain information about the environment of device 1000, such as discernable sound waves, visual patterns, or the like. This environmental information can be used to determine position of a computing device and/or an accessory device individually, or with respect to one another.

In some embodiments, device 1000 can include a GPS receiver, sometimes referred to as a GPS unit 1048. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information. In some cases, such information related to location can be used to facilitate determining position information for a computing device and/or an accessory device individually, or with respect to one another.

One or more processors 1018 (e.g., data processors) run various software components stored in medium 1002 to perform various functions for device 1000. In some embodiments, the software components include an operating system 1022, a communication module (or set of instructions) 1024, a motion processing module (or set of instructions) 1026 as disclosed herein, a content processing module 1028 as disclosed herein, and other applications (or set of instructions) 1034.

Operating system 1022 can be any suitable operating system, including iOS, macOS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1024 facilitates communication with other devices over one or more external ports 1036 or via wireless circuitry 1008 and includes various software components for handling data received from wireless circuitry 1008 and/or external port 1036. External port 1036 (e.g., USB, FireWire, Lightning connector, 60-pin connector, etc.) is adapted for coupling directly to other devices or indirectly over a network (e.g., the Internet, wireless LAN, etc.).

Motion processing module 1026 can assist in determining the current position (e.g., coordinates or other geographic location identifiers), orientation, and/or motion of device 1000. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, motion processing module 1026 receives data from GPS unit 1048 and analyzes the signals to determine the current position of the mobile device. In some embodiments, motion processing module 1026 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1008 and is passed to motion processing module 1026. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1000 based on the position coordinates of the corresponding transmitters. Regardless of the specific location technology used, motion processing module 1026 can receive information from which a location fix can be derived, interprets that information, and returns location information, such as geographic coordinates, latitude/longitude, or other location fix data. In some cases, motion processing module 1026 does not include these features, but rather includes only those features associated with motion processing modules 220, 234 of FIG. 2.

Content processing module 1028 can generate content, such as audio signals, based on motion data, such as a relative position of an accessory device with respect to a computing device, or a movement prediction, as disclosed herein, such as with reference to content processing modules 222, 236 of FIG. 2.

The one or more applications programs 1034 on the mobile device can include any applications installed on the device 1000, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The timer module can maintain various timers for any number of events.

The I/O subsystem 1006 can be coupled to a display system (not shown), which can be a touch-sensitive display. The display system displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1006 can include a display and user input devices such as a keyboard, mouse, and/or track pad. In some embodiments, I/O subsystem 1006 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1002) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1000 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology relates to the gathering and use of motion data, such as data indicative of movements of computing devices and/or accessory devices. The present disclosure contemplates that in some instances, this gathered data may include personal information data that uniquely identifies or can be used to contact or locate a specific person. Such personal information data can include demographic data, location-based data, telephone numbers, email addresses, twitter handles, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to better generate predicted orientations sufficiently in advance of a user moving to that predicted orientation, such that immersive audio can be generated and transmitted to the accessory device for presentation when the user reaches the predicted orientation. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of using motion data to generate predicted orientations, the present technology can be configured to allow users to select to "opt in" or "opt out" of participation in the collection of personal information data during registration for services or anytime thereafter. In another example, users may opt to provide collected motion data, such as anonymized motion data, for the purposes of improving prediction techniques. In yet another example, users may selected to opt out and only permit motion data to be briefly used for generating a predicted orientation. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, predicted orientations can be generated according to certain aspects of the present disclosure locally on a computing device and/or accessory device. Further, collected motion data can be processed to generate one or several predicted orientations, and then be deleted.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

As used below, any reference to a series of examples is to be understood as a reference to each of those examples disjunctively (e.g., "Examples 1-4" is to be understood as "Examples 1, 2, 3, or 4").

Example 1 is a computing device, comprising: one or more data processors; and a non-transitory computer-readable storage medium containing instructions which, when executed on the one or more data processors, cause the one or more data processors to perform operations including: establishing, on a computing device, a wireless communication link between the computing device and an accessory device, wherein the wireless communication link uses a clock; transmitting an audio signal using the wireless communication link; receiving first sensor data associated with the computing device, wherein the first sensor data is timestamped based on an internal clock of the computing device; receiving second sensor data associated with an inertial measurement unit of the accessory device, wherein the accessory device is movable with respect to the computing device, and wherein the second sensor data is timestamped based on an internal clock of the accessory device; receiving clock data associated with the clock of the wireless communication link; obtaining a timing offset associated with the second sensor data based on the clock data of the wireless communication link and the internal clock of the accessory device; synchronizing the second sensor data and the first sensor data using the timing offset to generate a set of synchronized sensor data; and generating a movement prediction of the accessory device using the set of synchronized sensor data, wherein the movement prediction is usable for generating an updated audio signal corresponding to the movement prediction.

Example 2 is the computing device of example(s) 1, wherein the first sensor data is associated with a position of the computing device.

Example 3 is the computing device of example(s) 1 or 2, wherein the receiving the second sensor data comprises receiving the second sensor data using the wireless communication link.

Example 4 is the computing device of example(s) 1-3, wherein the operations further comprise: generating the updated audio signal using the movement prediction, wherein the updated audio signal is a spatial audio signal corresponding to the movement prediction; and transmitting the updated audio signal using the wireless communication link.

Example 5 is the computing device of example(s) 1-4, wherein the operations further comprise transmitting the movement prediction using the wireless communication link, wherein the movement prediction is usable to generate the updated audio signal from the audio signal when received by the accessory device.

Example 6 is the computing device of example(s) 5, wherein the audio signal includes a plurality of sub-signals, and wherein generating the updated audio signal includes interpolating at least one of the plurality of sub-signals.

Example 7 is the computing device of example(s) 1-6, wherein synchronizing the second sensor data and the first sensor data comprises adjusting timestamps of at least one of the first sensor data and the second sensor data based on the timing offset.

Example 8 is the computing device of example(s) 1-7, wherein synchronizing the second sensor data and the first sensor data comprises aligning timestamped entries of the first sensor data with timestamped entries of the second sensor data, wherein the timestamped entries of the first sensor data or the timestamped entries of the second sensor data are generated using the timing offset prior to being received by the computing device.

Example 9 is the computing device of example(s) 1-8, wherein the operations further comprise displaying video content associated with the audio signal, wherein generating the movement prediction of the accessory device comprises predicting a future orientation of the accessory device with respect to the video content, and wherein generating the updated audio signal comprises generating an immersive audio signal based on the future orientation of the accessory device with respect to the video content.

Example 10 is a computer-implemented method, comprising: establishing, on a computing device, a wireless communication link between the computing device and an accessory device, wherein the wireless communication link uses a clock; transmitting an audio signal using the wireless communication link; receiving first sensor data associated with the computing device, wherein the first sensor data is timestamped based on an internal clock of the computing device; receiving second sensor data associated with an inertial measurement unit of the accessory device, wherein the accessory device is movable with respect to the computing device, and wherein the second sensor data is timestamped based on an internal clock of the accessory device; receiving clock data associated with the clock of the wireless communication link; obtaining a timing offset associated with the second sensor data based on the clock data of the wireless communication link and the internal clock of the accessory device; synchronizing the second sensor data and the first sensor data using the timing offset to generate a set of synchronized sensor data; and generating a movement prediction of the accessory device using the set of synchronized sensor data, wherein the movement prediction is usable for generating an updated audio signal corresponding to the movement prediction.

Example 11 is the method of example(s) 10, wherein the first sensor data is associated with a position of the computing device.

Example 12 is the method of example(s) 10 or 11, wherein the receiving the second sensor data comprises receiving the second sensor data using the wireless communication link.

Example 13 is the method of example(s) 10-12, further comprising: generating the updated audio signal using the movement prediction, wherein the updated audio signal is a spatial audio signal corresponding to the movement prediction; and transmitting the updated audio signal using the wireless communication link.

Example 14 is the method of example(s) 10-13, further comprising transmitting the movement prediction using the wireless communication link, wherein the movement prediction is usable to generate the updated audio signal from the audio signal when received by the accessory device.

Example 15 is the method of example(s) 14, wherein the audio signal includes a plurality of sub-signals, and wherein generating the updated audio signal includes interpolating at least one of the plurality of sub-signals.

Example 16 is the method of example(s) 10-15, wherein synchronizing the second sensor data and the first sensor data comprises adjusting timestamps of at least one of the first sensor data and the second sensor data based on the timing offset.

Example 17 is the method of example(s) 10-16, wherein synchronizing the second sensor data and the first sensor data comprises aligning timestamped entries of the first sensor data with timestamped entries of the second sensor data, wherein the timestamped entries of the first sensor data or the timestamped entries of the second sensor data are generated using the timing offset prior to being received by the computing device.

Example 18 is the method of example(s) 10-17, further comprising displaying video content associated with the audio signal, wherein generating the movement prediction of the accessory device comprises predicting a future orientation of the accessory device with respect to the video content, and wherein generating the updated audio signal comprises generating an immersive audio signal based on the future orientation of the accessory device with respect to the video content.

Example 19 is a computer-program product tangibly embodied in a non-transitory machine-readable storage medium, including instructions configured to cause a data processing apparatus to perform operations including: establishing, on a computing device, a wireless communication link between the computing device and an accessory device, wherein the wireless communication link uses a clock; transmitting an audio signal using the wireless communication link; receiving first sensor data associated with the computing device, wherein the first sensor data is timestamped based on an internal clock of the computing device; receiving second sensor data associated with an inertial measurement unit of the accessory device, wherein the accessory device is movable with respect to the computing device, and wherein the second sensor data is timestamped based on an internal clock of the accessory device; receiving clock data associated with the clock of the wireless communication link; obtaining a timing offset associated with the second sensor data based on the clock data of the wireless communication link and the internal clock of the accessory device; synchronizing the second sensor data and the first sensor data using the timing offset to generate a set of synchronized sensor data; and generating a movement prediction of the accessory device using the set of synchronized sensor data, wherein the movement prediction is usable for generating an updated audio signal corresponding to the movement prediction.

Example 20 is the computer-program product of example(s) 19, wherein the first sensor data is associated with a position of the computing device.

Example 21 is the computer-program product of example(s) 19 or 20, wherein the receiving the second sensor data comprises receiving the second sensor data using the wireless communication link.

Example 22 is the computer-program product of example(s) 19-21, wherein the operations further comprise: generating the updated audio signal using the movement prediction, wherein the updated audio signal is a spatial audio signal corresponding to the movement prediction; and transmitting the updated audio signal using the wireless communication link.

Example 23 is the computer-program product of example(s) 19-22, wherein the operations further comprise transmitting the movement prediction using the wireless communication link, wherein the movement prediction is usable to generate the updated audio signal from the audio signal when received by the accessory device.

Example 24 is the computer-program product of example(s) 23, wherein the audio signal includes a plurality of sub-signals, and wherein generating the updated audio signal includes interpolating at least one of the plurality of sub-signals.

Example 25 is the computer-program product of example(s) 19-24, wherein synchronizing the second sensor data and the first sensor data comprises adjusting timestamps of at least one of the first sensor data and the second sensor data based on the timing offset.

Example 26 is the computer-program product of example(s) 19-25, wherein synchronizing the second sensor data and the first sensor data comprises aligning timestamped entries of the first sensor data with timestamped entries of the second sensor data, wherein the timestamped entries of the first sensor data or the timestamped entries of the second sensor data are generated using the timing offset prior to being received by the computing device.

Example 27 is the computer-program product of example(s) 19-26, wherein the operations further comprise displaying video content associated with the audio signal, wherein generating the movement prediction of the accessory device comprises predicting a future orientation of the accessory device with respect to the video content, and wherein generating the updated audio signal comprises generating an immersive audio signal based on the future orientation of the accessory device with respect to the video content.

What is claimed is:

1. A computing device comprising:
   one or more data processors; and
   a non-transitory computer-readable storage medium containing instructions which, when executed on the one or more data processors, cause the one or more data processors to perform operations including:
   establishing, on the computing device, a wireless communication link between the computing device and an accessory device;
   transmitting an audio signal using the wireless communication link;
   receiving sensor data from a sensor module of the accessory device or the computing device, wherein the accessory device is movable with respect to the computing device; and
   generating position information of the accessory device with respect to the computing device using the sensor data, wherein the position information is usable for generating an updated audio signal corresponding to the position information.

2. The computing device of claim 1, wherein the sensor data is associated with a position of the computing device.

3. The computing device of claim 1, wherein the receiving of the sensor data comprises receiving the sensor data using the wireless communication link.

4. The computing device of claim 1, wherein the operations further comprise:
   generating the updated audio signal using the position information, wherein the updated audio signal is a spatial audio signal corresponding to the position information; and
   transmitting the updated audio signal using the wireless communication link.

5. The computing device of claim 1, wherein the operations further comprise transmitting the position information using the wireless communication link, wherein the position information is usable to generate the updated audio signal from the audio signal when received by the accessory device.

6. The computing device of claim 5, wherein the audio signal includes a plurality of sub-signals, and wherein generating the updated audio signal includes interpolating at least one of the plurality of sub-signals.

7. The computing device of claim 1, wherein the operations further comprise displaying video content associated with the audio signal, wherein generating the position information of the accessory device comprises predicting a future orientation of the accessory device with respect to the video content, and wherein generating the updated audio signal comprises generating an immersive audio signal based on the future orientation of the accessory device with respect to the video content.

8. The computing device of claim 1, wherein the sensor module an inertial measurement unit of the accessory device.

9. The computing device of claim 1, wherein the sensor module is an imaging sensor of the computing device.

10. The computing device of claim 9, wherein the imaging sensor is a ranging sensor.

11. A computer-implemented method, comprising:
  establishing, on a computing device, a wireless communication link between the computing device and an accessory device;
  transmitting an audio signal using the wireless communication link;
  receiving sensor data from a sensor module of the accessory device or the computing device, wherein the accessory device is movable with respect to the computing device; and
  generating position information of the accessory device with respect to the computing device using the sensor data associated with the accessory device, wherein the position information is usable for generating an updated audio signal corresponding to the position information.

12. The method of claim 11, wherein the sensor data is associated with a position of the computing device.

13. The method of claim 11, wherein the receiving of the sensor data comprises receiving the sensor data using the wireless communication link.

14. The method of claim 11, further comprising:
  generating the updated audio signal using the position information, wherein the updated audio signal is a spatial audio signal corresponding to the position information; and
  transmitting the updated audio signal using the wireless communication link.

15. The method of claim 11, further comprising transmitting the position information using the wireless communication link, wherein the position information is usable to generate the updated audio signal from the audio signal when received by the accessory device.

16. The method of claim 15, wherein the audio signal includes a plurality of sub-signals, and wherein generating the updated audio signal includes interpolating at least one of the plurality of sub-signals.

17. The method of claim 11, further comprising displaying video content associated with the audio signal, wherein generating the position information of the accessory device comprises predicting a future orientation of the accessory device with respect to the video content, and wherein generating the updated audio signal comprises generating an immersive audio signal based on the future orientation of the accessory device with respect to the video content.

18. The method of claim 11, wherein the position information includes a movement prediction of the accessory device.

19. The method of claim 18, wherein the updated audio signal is generated using the movement prediction and corresponds to future position of the accessory device.

20. A computer-program product tangibly embodied in a non-transitory machine-readable storage medium, including instructions configured to cause a data processing apparatus to perform operations including:
  establishing, on a computing device, a wireless communication link between the computing device and an accessory device;
  transmitting an audio signal using the wireless communication link;
  receiving sensor data from a sensor module of the accessory device or the computing device, wherein the accessory device is movable with respect to the computing device; and
  generating position information of the accessory device with respect to the computing device using the sensor data, wherein the position information is usable for generating an updated audio signal corresponding to the position information.

* * * * *